(12) United States Patent
Oda et al.

(10) Patent No.: US 11,451,122 B2
(45) Date of Patent: Sep. 20, 2022

(54) METHOD FOR MANUFACTURING LAMINATED IRON CORE PRODUCT

(71) Applicant: MITSUI HIGH-TEC, INC., Fukuoka (JP)

(72) Inventors: Jin Oda, Fukuoka (JP); Akinori Mizuno, Fukuoka (JP); Yuichi Shiraishi, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 15 days.

(21) Appl. No.: 16/674,430

(22) Filed: Nov. 5, 2019

(65) Prior Publication Data

US 2020/0177064 A1    Jun. 4, 2020

(30) Foreign Application Priority Data

Nov. 30, 2018   (JP) .............................. JP2018-224772

(51) Int. Cl.
| | |
|---|---|
| *H02K 15/02* | (2006.01) |
| *H02K 15/03* | (2006.01) |
| *H02K 1/276* | (2022.01) |
| *H02K 1/28* | (2006.01) |
| *H02K 15/12* | (2006.01) |

(52) U.S. Cl.
CPC .............. *H02K 15/03* (2013.01); *H02K 1/276* (2013.01); *H02K 1/28* (2013.01); *H02K 15/12* (2013.01); *Y10T 29/49012* (2015.01)

(58) Field of Classification Search
CPC ...... H02K 1/276; H02K 11/044; H02K 15/02; H02K 15/03; H02K 15/12; Y10T 29/49012; Y10T 29/732

USPC ......... 29/598, 596, 604, 606, 607, 609, 732, 29/738
See application file for complete search history.

(56) References Cited

U.S. PATENT DOCUMENTS

| | | | |
|---|---|---|---|
| 4,493,858 | A | 1/1985 | Nishizawa et al. |
| 10,201,844 | B2 * | 2/2019 | Nishinaka ................ B05D 1/26 |
| 2002/0197171 | A1 | 12/2002 | Ojima et al. |
| 2004/0083600 | A1 * | 5/2004 | Neuenschwander ..... H01F 3/02 |
| | | | 29/609 |
| 2014/0042854 | A1 | 2/2014 | Asahi et al. |
| 2015/0061445 | A1 | 3/2015 | Ishimatsu et al. |
| 2016/0380493 | A1 | 12/2016 | Matsumoto et al. |

(Continued)

FOREIGN PATENT DOCUMENTS

| | | |
|---|---|---|
| CN | 101871041 | 10/2010 |
| CN | 103580326 | 2/2014 |

(Continued)

OTHER PUBLICATIONS

Extended European Search Report issued in 19208896.1, dated Apr. 22, 2020.

*Primary Examiner* — Thiem D Phan
(74) *Attorney, Agent, or Firm* — Greenblum & Bernstein, P.L.C.

(57) ABSTRACT

A method for manufacturing a laminated iron core product includes laminating a plurality of iron core members which are punched from a first metal plate to form a laminate, removing oil adhering to the laminate, removing oil adhering to an end surface plate which is punched from a second metal plate, and disposing the end surface plate on an end surface of the laminate and welding the end surface plate and the laminate.

4 Claims, 6 Drawing Sheets

(56) References Cited

U.S. PATENT DOCUMENTS

2018/0076700 A1 3/2018 Nagai et al.
2019/0305654 A1 10/2019 Matsubayashi et al.

FOREIGN PATENT DOCUMENTS

| | | |
|---|---|---|
| JP | 53-109279 A | 9/1978 |
| JP | 53-122191 A | 10/1978 |
| JP | 58-207847 | 12/1983 |
| JP | 59-162741 | 9/1984 |
| JP | 10-146624 A | 6/1998 |
| JP | 11-290965 A | 10/1999 |
| JP | 2006-81378 | 3/2006 |
| JP | 2006-334648 A | 12/2006 |
| JP | 2007-60765 | 3/2007 |
| JP | 2015-53764 | 3/2015 |
| JP | 2018-42426 | 3/2018 |
| JP | 2018-68073 | 4/2018 |
| JP | 6382465 B1 | 8/2018 |
| JP | 6382465 B1 * | 8/2018 |
| JP | 2018-143034 | 9/2018 |
| JP | 6430058 | 11/2018 |
| WO | 2018/116585 A1 | 6/2018 |

* cited by examiner

METHOD FOR MANUFACTURING LAMINATED IRON CORE PRODUCT

CROSS REFERENCE TO RELATED APPLICATION(S)

This application is based upon and claims the benefit of priority of Japanese Patent Application No. 2018-224772 filed on Nov. 30, 2018, the contents of which are incorporated herein by reference in its entirety.

BACKGROUND OF THE INVENTION

1. Field of the Invention

The present disclosure relates to a method and an apparatus for manufacturing a laminated iron core product.

2. Description of the Related Art

JP-A-2006-334648 as Patent Literature 1 discloses a method for manufacturing a laminated iron core. The method disclosed in JP-A-2006-334648 includes: intermittently feeding, from an uncoiler, a coil material, which is a strip-shaped metal plate wound in a coil shape (plate to be processed); punching the metal plate into a predetermined shape with a punch to form a plurality of punched members; and laminating the plurality of punched members to form an iron core body.

Patent Literature 1: JP-A-2006-334648

SUMMARY OF THE INVENTION

For the purpose of preventing wear of the punch and improving the punchability for the punched member, it is common that the coil material is coated with press working oil (also called stamping oil and simply referred to as "oil" hereinafter). When the laminate is subjected to a heat treatment (for example, welding) in a subsequent process while the oil is adhered to the laminate, soot may be generated, discoloration may occur in the laminate, blowholes (cavities) may be generated, or the strength of the welded portion may be lowered. Thus, it is common to volatilize most of the oil, for example, 1 day or longer, store the laminate in a storage location, and then subject the laminate to a heat treatment. However, cost may be required to secure the storage location, and the production efficiency (throughput) of the laminated iron core can be lowered.

Accordingly, the present disclosure describes a method for manufacturing a laminated iron core product capable of improving the welding quality when welding a laminate and an end surface plate.

A method for manufacturing a laminated iron core product according to an aspect of the present disclosure includes: laminating a plurality of iron core members which are punched from a first metal plate to form a laminate; removing oil adhering to the laminate; removing oil adhering to an end surface plate which is punched from a second metal plate; and disposing the end surface plate on an end surface of the laminate and welding the end surface plate and the laminate.

According to a method for manufacturing a laminated iron core product of the present disclosure, the welding quality can be improved when welding the laminate and the end surface plate.

There may be provided an apparatus for manufacturing a laminated iron core product, the apparatus including: a first punching device, configured to punch a first plate metal plate and laminate a plurality of iron core members to form a laminate; a first oil removing device, configured to remove oil adhering to the laminate; a second punching device, configure to punch a second metal plate to form an end surface plate; a second oil removing device, configured to remove oil adhering to the end surface plate; and a welding device, configured to dispose the end surface plate on an end surface of the laminate and weld the end surface plate and the laminate.

DETAILED DESCRIPTION OF THE EXEMPLARY EMBODIMENTS

Figure 1:
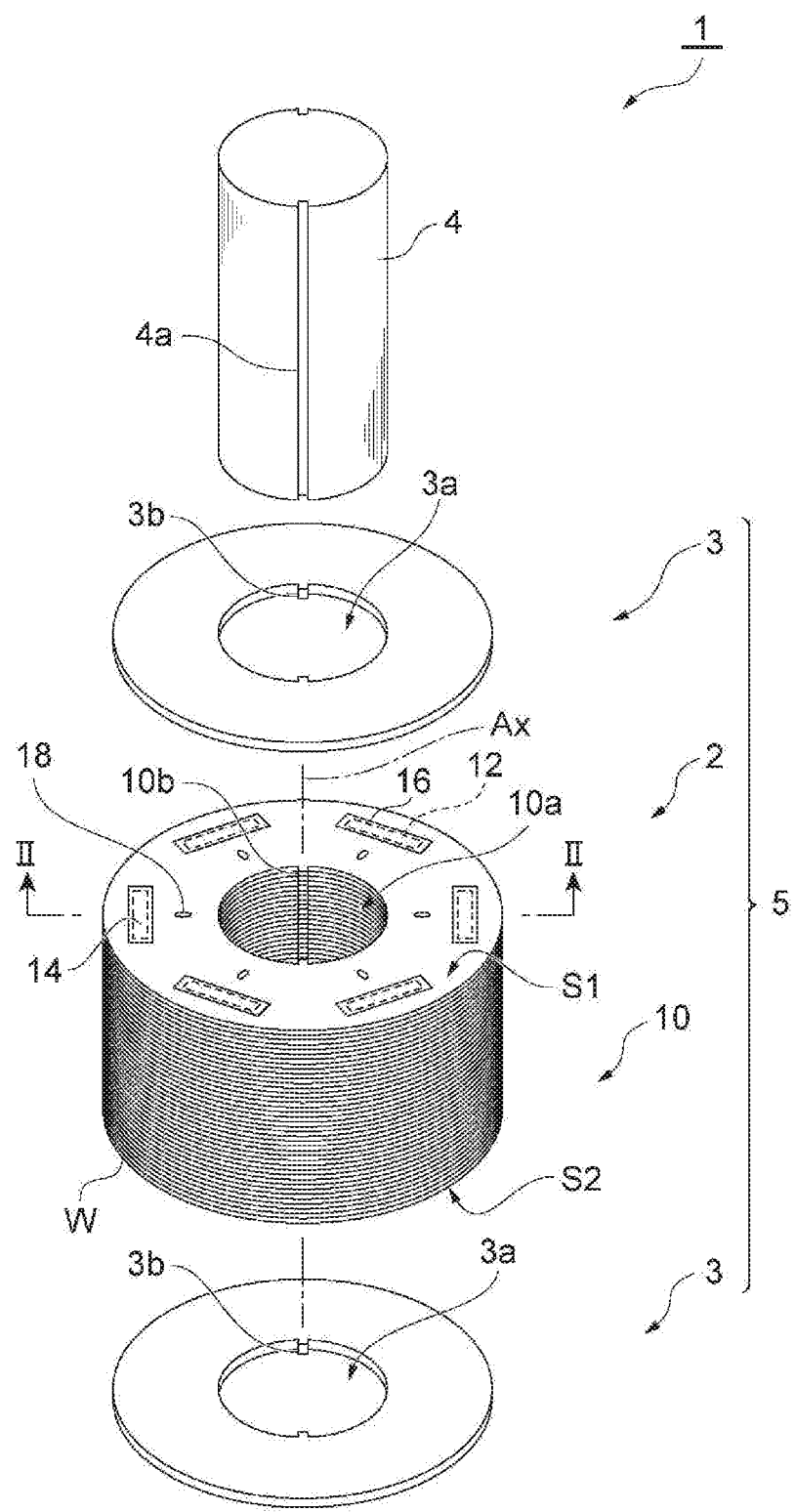
FIG. 1 is a perspective view showing an example of a rotor.

Hereinafter, an example of an embodiment according to the present disclosure will be described in detail with reference to the accompanying drawings. In the following description, the same elements or elements having the same functions will be denoted by the same reference numerals or signs, and a repetitive description thereof will be omitted.

[Configuration of Rotor]

First, a configuration of a rotor 1 will be described with reference to FIGS. 1 and 2. The rotor 1 constitutes an electric motor (motor) by being combined with a stator. The rotor 1 may constitute a part of an interior permanent magnet (IPM) motor, for example. The rotor 1 includes a rotor laminated iron core 2, a pair of end surface plates 3, and a shaft 4.

The rotor laminated iron core 2 includes a laminate 10 (iron core body), a plurality of permanent magnets 12, and a plurality of solidified resins 14.

As shown in FIG. 1, the laminate 10 has a cylindrical shape. A shaft hole 10a penetrating the laminate 10 is provided in a central portion of the laminate 10, so as to extend along a central axis Ax. The shaft hole 10a extends in a height direction (upper-lower direction) of the laminate 10. Since the laminate 10 rotates around the central axis Ax, the central axis Ax is also a rotation axis.

A pair of protrusion portions 10b are formed on an inner circumferential surface of the shaft hole 10a. The protrusion portion 10b extends in the height direction from an upper end surface S1 to a lower end surface S2 of the laminate 10. The pair of protrusion portions 10b face each other with the central axis Ax therebetween, and protrude from the inner circumferential surface of the shaft hole 10a to the central axis Ax.

A plurality of magnet-insert holes 16 (resin forming regions) are formed in the laminate 10. As shown in FIG. 1, the magnet-insert holes 16 are arranged at predetermined intervals along an outer circumferential edge of the laminate 10. As shown in FIG. 2, the magnet-insert hole 16 penetrates the laminate 10 in a manner of extending along the central axis Ax. That is, the magnet-insert hole 16 extends in the height direction. The magnet-insert hole 16 may have, for example, a shape of a long hole extending along the outer circumferential edge of the laminate 10. The number of the magnet-insert holes 16 may be six, for example. The position, shape, and number of the magnet-insert hole 16 may be changed according to use, required performance, or the like of the motor.

The laminate 10 is configured by laminating a plurality of punched members W (iron core members). The punched member W is a plate-like body formed by punching a metal plate M2 (to be described later) into a predetermined shape, and has a shape corresponding to the laminate 10. The metal plate may be, for example, an electromagnetic steel plate. The laminate 10 may be made of so-called rolling lamination. The term "rolling lamination" refers to relatively rotating punched members W with angles and laminating a plurality of punched members W. The rolling lamination is mainly performed to offset a deviation in plate thickness of the punched members W. The angles in the rolling lamination may be set to any dimension.

Figure 2:
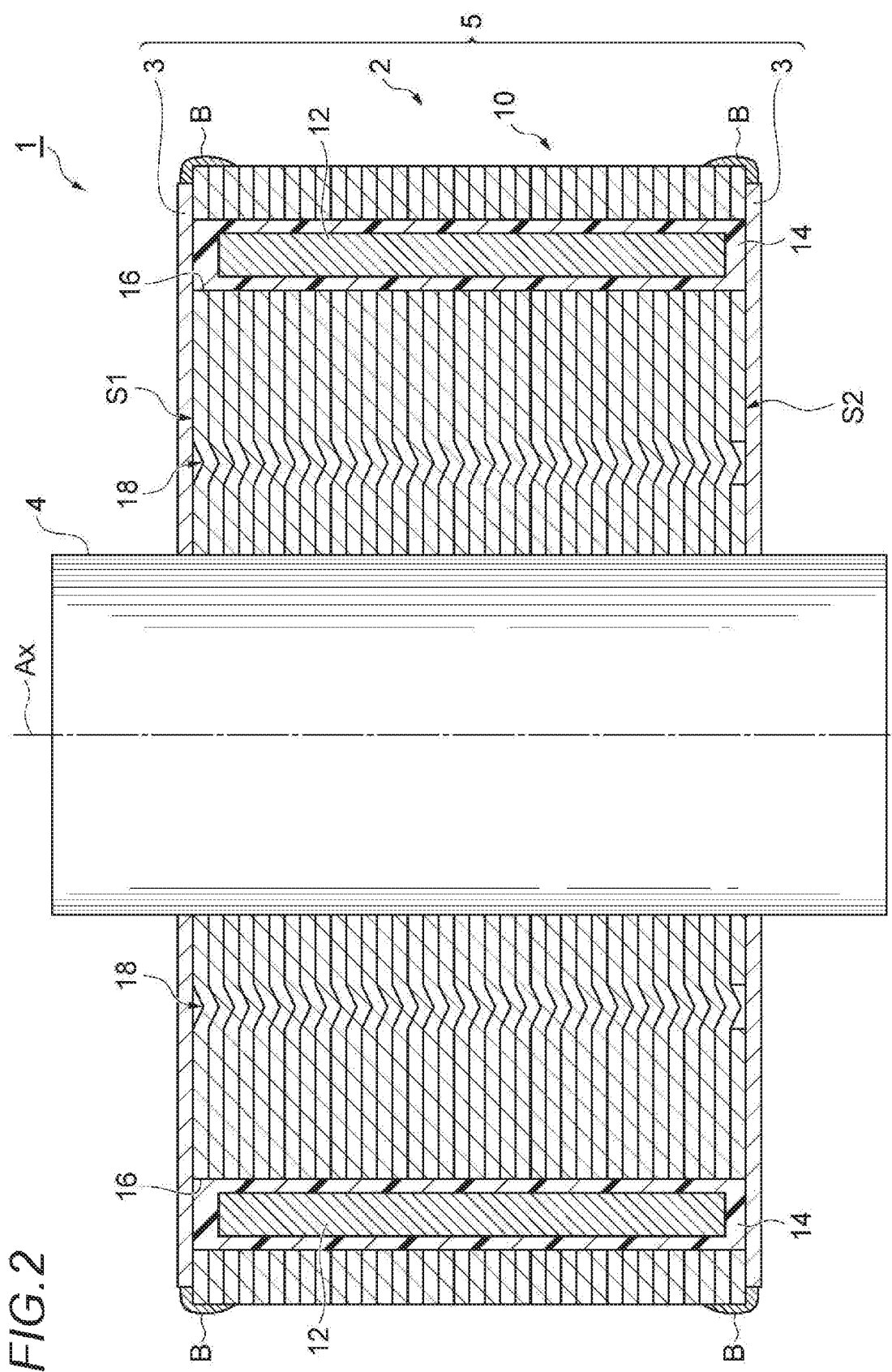
FIG. 2 is a cross-sectional view taken along a line II-II of FIG. 1.

As shown in FIGS. 1 and 2, the punched members W adjacent to each other in a lamination direction may be fastened by a caulking portion 18. The punched members W may be fastened by various known methods instead of the caulking portion 18. For example, the plurality of punched members W may be joined together using an adhesive or a resin material, or may be joined together by welding. Alternatively, a temporary caulking portion may be provided on the punched member W, and the plurality of punched members W may be fastened via the temporary caulking portion to obtain the laminate 10, and then the temporary caulking portion may be removed from the laminate. The term "temporary caulking portion" refers to a caulking portion which is used to temporarily integrate a plurality of punched members W and is removed in the process of manufacturing the rotor laminated iron core 2.

As shown in FIGS. 1 and 2, the permanent magnets 12 are inserted into respective magnet-insert holes 16. A shape of the permanent magnet 12 is not particularly limited, and the permanent magnet 12 may have a rectangular parallelepiped shape. A type of the permanent magnet 12 may be determined according to the use, the required performance, or the like of the motor, and may be, for example, a sintered magnet or a bonded magnet.

The solidified resin 14 is obtained by filling a resin material in a molten state (molten resin) into the magnet-insert hole 16 in a state where the permanent magnet 12 is inserted thereto. The solidified resin 14 has a function of fixing the permanent magnet 12 in the magnet-insert hole 16 and a function of joining the adjacent punched members W in the lamination direction (upper-lower direction). Examples of the resin material constituting the solidified resin 14 include a thermosetting resin and a thermoplastic resin. A specific example of the thermosetting resin includes a resin composition including an epoxy resin, a curing initiator, and an additive. Examples of the additive include a filler, a flame retardant, and a stress reducing agent.

As shown in FIG. 1, the end surface plate 3 has a annular shape. That is, the shaft hole 3a penetrating the end surface plate 3 is provided at a center portion of the end surface plate 3. An outer diameter of the end surface plate 3 may be, for example, set smaller than an outer diameter of the laminate 10 or may be set to the same extent as the outer diameter of the laminate 10.

A pair of protrusions 3b are formed on an inner circumferential surface of the shaft hole 3a. The pair of protrusions 3b face each other with the central axis Ax therebetween, and protrude from the inner circumferential surface of the shaft hole 3a to the central axis Ax.

The end surface plates 3 are respectively disposed on the upper end surface S1 and the lower end surface S2 of the laminate 10, and are joined to the laminate 10 by welding. For example, as shown in FIG. 2, the end surface plate 3 is joined to the laminate 10 via a weld bead B provided to straddle the end surface plate 3 and the laminate 10. Thus, since the rotor laminated iron core 2 and the pair of end surface plates 3 are integrated by welding, these parts together function as a single rotating body 5 (laminated iron core product).

The end surface plate 3 is a plate-like body or a sheet-like body formed by punching a metal plate M1 (to be described later) into a predetermined shape, and has a shape corresponding to the laminate 10. The metal plate may have a strength that can withstand thermal deformation caused by welding, or may have an insulating property that does not conduct electricity to the laminate 10. An insulating film may be provided on a surface of the metal plate. The metal plate may be, for example, a stainless steel plate. Examples of the stainless steel include austenitic stainless steel (SUS304, or the like). The metal plate may be made of a nonmagnetic material. A thermal expansion coefficient of the end surface plate 3 is usually higher than a thermal expansion coefficient of the punched member W, and may be substantially the same as the thermal expansion coefficient of the punched member W, or may be smaller than the thermal expansion coefficient of the punched member W. When the thermal expansion coefficient of the end surface plate 3 is substantially the same as the thermal expansion coefficient of the punched member W, it is difficult for stress to act on the weld bead B straddling the end surface plate 3 and the laminate 10.

The shaft 4 has a cylindrical shape as a whole. The shaft 4 is formed with a pair of concave grooves 4a. The concave groove 4a extends in the extending direction of the shaft 4 from one end to the other end of the shaft 4. The shaft 4 is inserted into the shaft hole 3a and the shaft hole 10a. At this time, the protrusion 3b and the protrusion portion 10b are engaged with the concave groove 4a. Accordingly, a rotational force is transmitted between the shaft 4 and the rotor laminated iron core 2.

[Apparatus for Manufacturing Rotating Body]

Figure 3:
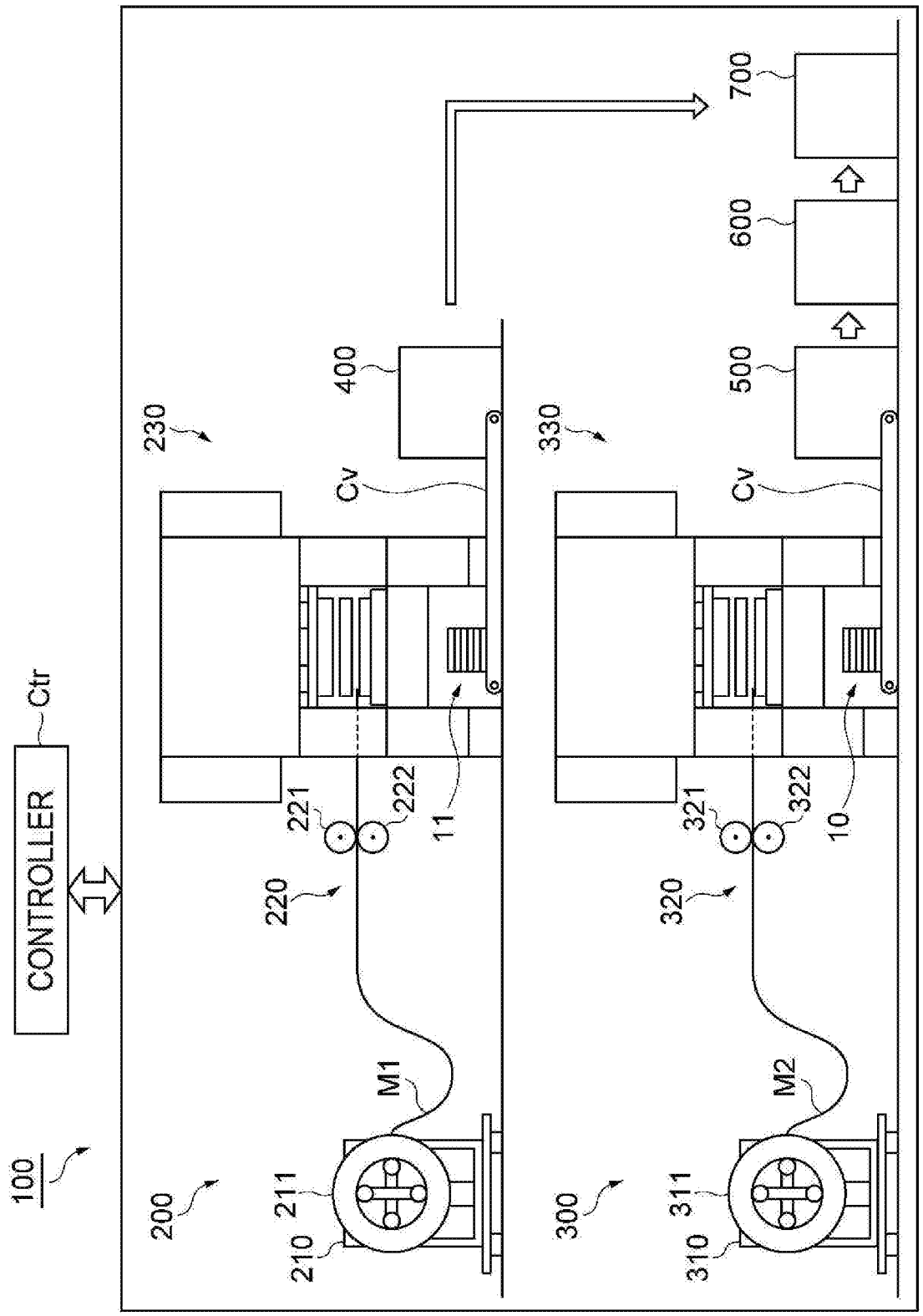
FIG. 3 is a schematic diagram showing an example of an apparatus for manufacturing a rotating body.

Next, an apparatus 100 for manufacturing the rotating body 5 will be described with reference to FIGS. 3 and 4.

The manufacturing apparatus 100 is a device for manufacturing the rotating body 5 from a strip-shaped metal plate (plate to be processed). The manufacturing apparatus 100 includes two punching units 200, 300, an oil removing device 400, a preheating device 500, a resin injecting device 600, a welding device 700, and a controller Ctr (control unit).

The punching unit 200 is configured to punch the metal plate M1 (second metal plate) for the end surface plate 3 into a predetermined shape to form a temporary laminate 11. The punching unit 200 includes an uncoiler 210, a feeding device 220, and a punching device 230.

The uncoiler 210 rotatable holds a coil material 211 in a state where the coil material 211 is mounted, with the metal plate M1 wound in a coil shape. Oil for press working is applied to the surface of the metal plate M1. The feeding device 220 includes a pair of rollers 221, 222 sandwiching the metal plate M1 from an upper side and a lower side. The pair of rollers 221, 222 rotate and stop based on an instruction signal from the controller Ctr, and intermittently and sequentially feed the metal plate M1 to the punching device 230.

The punching device 230 operates based on the instruction signal from the controller Ctr. The punching device 230 has a function of sequentially punching the metal plate M1 intermittently ted by the feeding device 220 to form the end surface plate 3, and a function of sequentially laminating the end surface plates 3 obtained by the punching to manufacture the temporary laminate 11.

The temporary laminate 11 is formed by laminating a plurality of end surface plates 3 without joining the same together. Since oil is applied to the surface of the metal plate M1, the oil is interposed between the plurality of end surface plates 3 constituting the temporary laminate 11. That is, the temporary laminate 11 is in a state where the plurality of end surface plates 3 are in close contact with each other due to the surface tension of the oil.

The punching unit 300 is configured to punch the metal plate M2 (first metal plate) for the punched member W into a predetermined shape to form the laminate 10. The punching unit 300 includes an uncoiler 310, a feeding device 320, and a punching device 330.

The uncoiler 310 rotatably holds a coil material 311 in a state where the coil material 311 is mounted, with the metal plate M2 wound in a coil shape. Oil for press working is applied to the surface of the metal plate M2. The feeding device 320 includes a pair of rollers 321, 322 sandwiching the metal plate M2 from an upper side and a lower side. The pair of rollers 321, 322 rotate and stop based on an instruction signal from the controller Ctr, and intermittently and sequentially feed the metal plate M2 to the punching device 330.

The punching device 330 operates based on the instruction signal from the controller Ctr. The punching device 330 has a function of sequentially punching the metal plate M2 intermittently fed by the feeding device 320 to form the punched member W, and a function of sequentially laminating the punched members W obtained by the punching to manufacture the laminate 10.

As described above, the laminate 10 is formed by laminating a plurality of punched members W in a state of being joined together by the caulking portion 18 or the like. Since oil is applied to the surface of the metal plate M2, the oil is interposed between the plurality of punched members W constituting the laminate 10.

The oil removing device 400 has a function of removing oil from the end surface plate 3 of the temporary laminate 11 conveyed from the punching device 230 by a conveyor Cv or the like. As shown in FIG. 4, the oil removing device 400 includes a blower 401 and a nozzle 402 connected to the blower 401. The blower 401 operates based on an instruction from the controller Ctr, and is configured to send gas for example, air) to the nozzle 402. The temperature of the gas may be about 5° C. to 150° C., for example. The blower 401 may be, for example, an air blower configured to blow normal temperature air, or may be a dryer configured to blow hot air or warm air. The gas sent from the blower 401 is blown to the temporary laminate 11 through the nozzle 402, so that the oil adhering to the temporary laminate 11 (end surface plate 3) is blown off. The nozzle 402 may, for example, inject gas between the uppermost end surface plate 3 of the temporary laminate 11 and the end surface plate 3 adjacent thereto.

The preheating device 500 has a function of preheating the laminate 10 conveyed from the punching device 330 by the conveyor Cv or the like. For example, as shown in FIG. 4, the laminate 10 may be conveyed to the preheating device 500 in a state of being attached to a tool 20. The tool 20 may include a base 21 and a post 22 extending upward from the base 21. The laminate 10 may be placed on the base 21 in a state where the shaft hole 10a is inserted through the post 22.

The preheating device 500 operates based on an instruction from the controller Ctr, and is configured to heat the laminate 10 conveyed therein by a heating source. The heating source may be, for example, a heater, or a dryer configured to blow hot air or warm air. The laminate 10 may be heated to, for example, about 150° C. to 185° C., or may be heated to about 160° C. to 175° C. By heating with the preheating device 500, most or all of the oil adhering to the laminate 10 is evaporated.

The resin injecting device 600 operates based on an instruction signal from the controller Ctr, and has a function of injecting a molten resin into the magnet-insert hole 16 in a state where the permanent magnet 12 is inserted thereto. The resin injecting device 600 may have a function of inserting the permanent magnet 12 through the magnet-insert hole 16. Alternatively, before the molten resin is injected into the magnet-insert hole 16 by the resin injecting device 600, the permanent magnet 12 may be inserted into the magnet-insert hole 16 by another device or manually.

Figure 4:
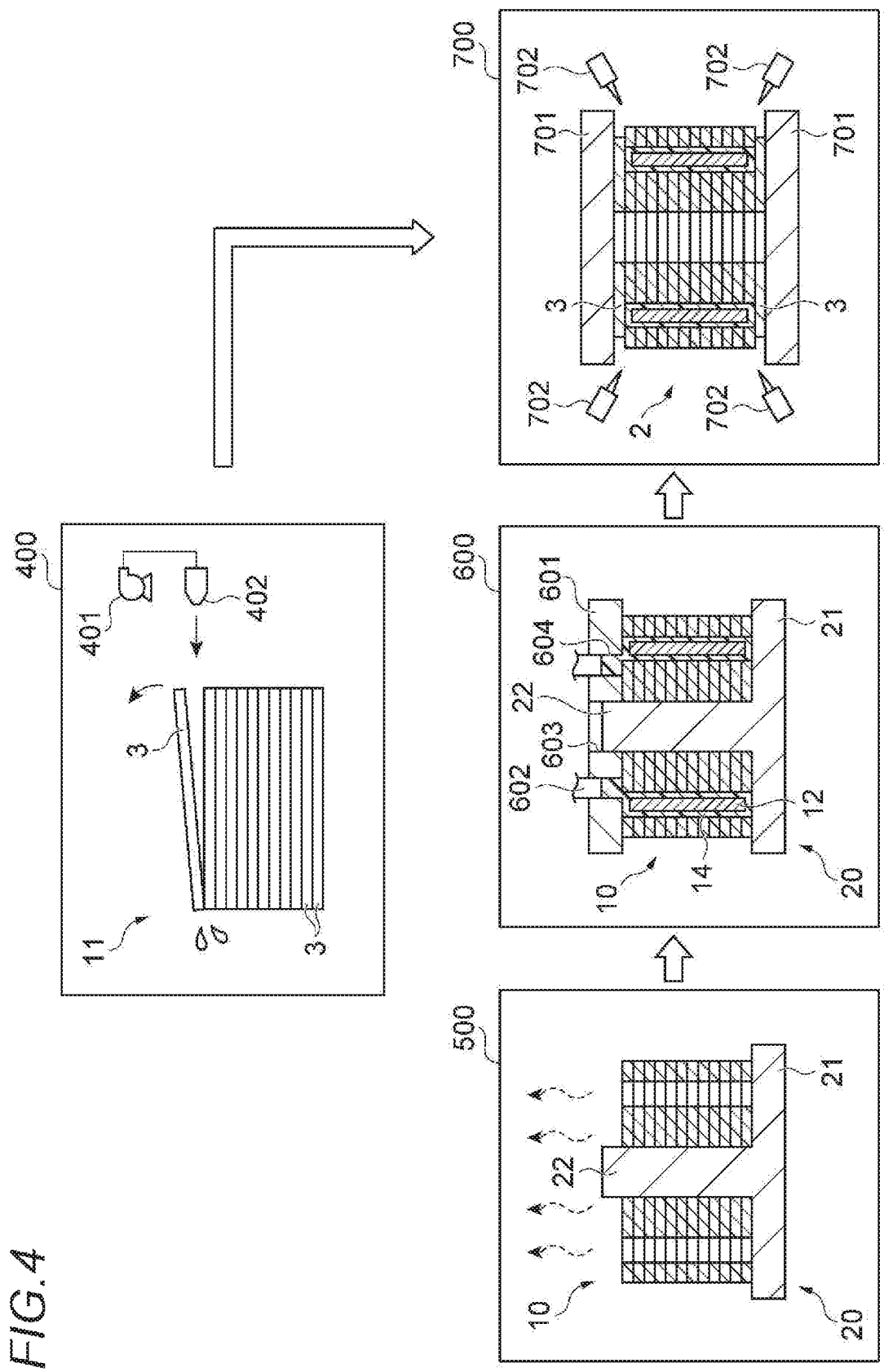
FIG. 4 is a schematic diagram showing an example of a process for manufacturing the rotating body.

As shown in FIG. 4, the resin injecting device 600 includes an upper die 601 and a plurality of plungers 602. The upper die 601 is provided with one through hole 603 and a plurality of accommodation holes 604. The through hole 603 is located at a substantially central portion of the upper die 601. The through hole 603 has a shape corresponding to the post 22 (substantially circular), and the post 22 can be inserted therethrough. An internal heat source may be disposed inside the upper die 601.

The plurality of accommodation holes 604 penetrate the upper die 601 and are arranged at predetermined intervals along the periphery of the through holes 603. Each accommodation hole 604 is located at a position corresponding to each of the magnet-insert holes 16 of the laminate 10 when the tool 20 and the upper die 601 sandwich the laminate 10. Each accommodation hole 604 has a cylindrical shape and can accommodate at least one resin pellet.

When the internal heat source of the upper die 601 operates to heat the upper die 601, the laminate 10 in contact with the upper die 601 is heated, and resin pellets P accommodated in the accommodation holes 604 are heated. Accordingly, the resin pellet P melts and changes to a molten resin.

The plurality of plungers 602 are located above the upper die 601. Each plunger 602 is configured to be inserted into and removed from the corresponding accommodation hole 604 by a driving source (not shown).

The welding device 700 operates based on the instruction signal from the controller Ctr. The welding device 700 has a function of welding the rotor laminated iron core 2 and the end surface plate 3. As shown in FIG. 4, the welding device 700 includes a pair of protective plates 701 and a plurality of welding torches 702.

The protective plate 701 is configured to sandwich the rotor laminated iron core 2 and the end surface plates 3 in a state where the end surface plates 3 are disposed on the end surfaces S1 and S2 of the rotor laminated iron core 2, respectively. The protective plate 701 may have a disc shape. An outer diameter of the protective plate 701 may be set larger than the outer diameter of the end surface plate 3 and the laminate 10 or may be set to the same extent as the outer diameter of the end surface plate 3 and the laminate 10. An internal source (for example, a heater) for heating the end surface plate 3 may be provided inside the protective plate 701.

The welding torch 702 is configured to weld the end surface plates 3 and the laminate 10. The welding torch 702 may be, for example, a laser welder.

The controller Ctr is configured to generate an instruction signal for operating each parts of the manufacturing apparatus 100 based on, for example, a program recorded in a recording medium (not shown) or operation input from an operator, and transmit the instruction signal to the corresponding part.

[Method for Manufacturing Rotor]

Next, a method for manufacturing the rotor 1 will be described with reference to FIGS. 4 and 5. First, the metal plate M2 is sequentially punched by the punching device 330 and the punched members W are laminated to form the laminate 10 (see step S15 in FIG. 5).

Next, as shown in FIG. 4, the laminate 10 formed by the punching device 330 is attached to the tool 20 and conveyed to the preheating device 500 together with the tool 20. By heating the laminate 10 in the preheating device 500, most or all of the oil adhering to the laminate 10 is evaporated (see step S12 in FIG. 5). Accordingly, most or all of the oil is removed from the laminate 10.

Figure 5:
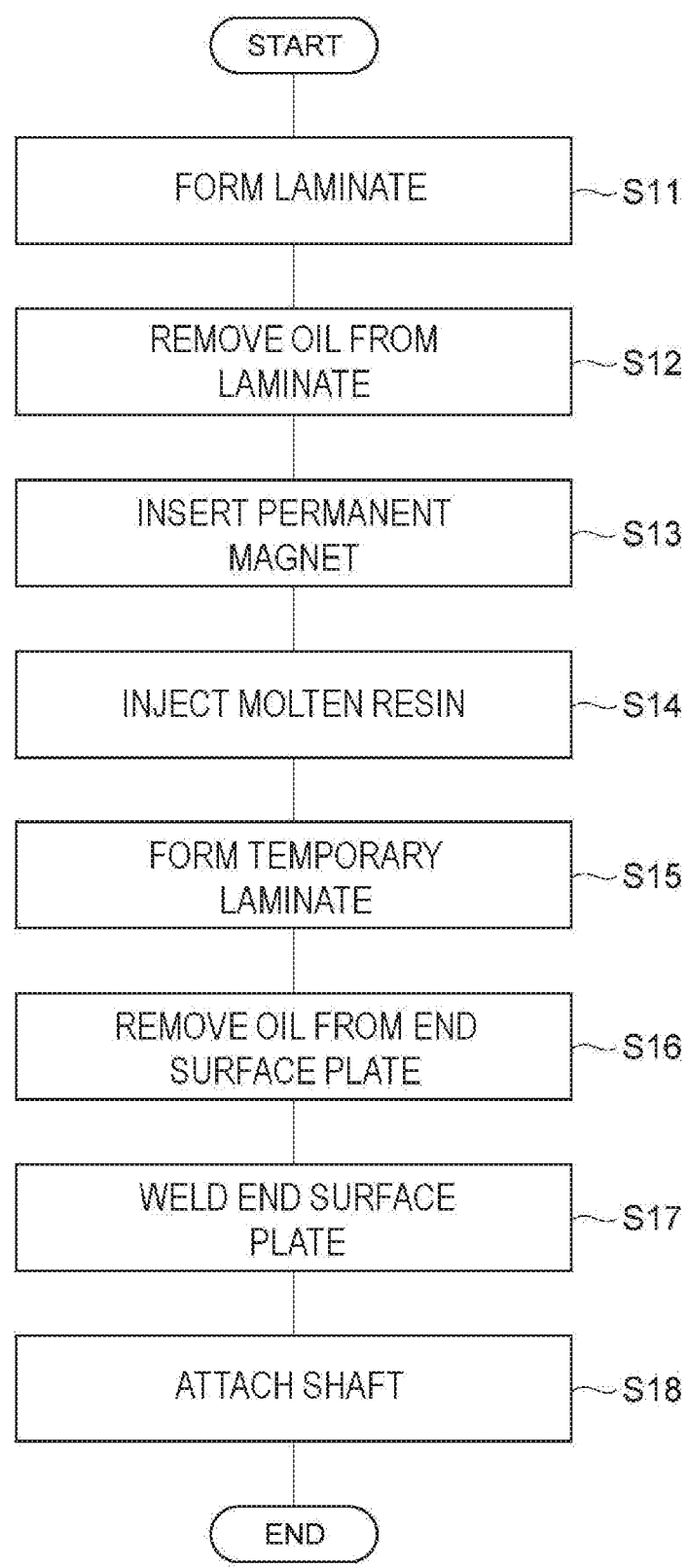
FIG. 5 is a flowchart showing an example of a method for manufacturing the rotating body.

Next, the permanent magnet 12 is inserted into each magnet-insert hole 16 (see step S13 in FIG. 5). Next, the upper die 601 is placed on the laminate 10. Thus, the laminate 10 is in a state of being sandwiched between the tool 20 (base 21) and the upper die 601 from the lamination direction. Next, the resin pellet is put into each accommodation hole 604. When the resin pellet is melted by the internal source of the upper die 601, the molten resin is injected into each magnet-insert hole 16 by the plunger 602 (see step S14 in FIG. 5). Thereafter, when the molten resin is solidified, the solidified resin 14 is formed in the magnet-insert hole 16. When the tool 20 and the upper die 601 are removed from the laminate 10, the rotor laminated, iron core 2 is completed.

Next, the metal plate M1 is sequentially punched by the punching device 230 and the end surface plates 3 are laminated to form the temporary laminate 11 (see step S15 in FIG. 5). Next, the temporary laminate 11 formed by the punching device 230 is conveyed to the oil removing device 400. In the oil removing device 400, the nozzle 402 injects gas between the uppermost end surface plate 3 of the temporary laminate 11 and the end surface plate 3 adjacent thereto, the end surface plates 3 are delaminated from the temporary laminate 11 one by one, and the oil adhering to the end surface plates 3 is blown off (see step S16 in FIG. 5). Accordingly, most or all of the oil is removed from the end surface plates 3. Steps S15 and S16 may be performed before the end surface plate 3 is welded to the laminate 10, and may be performed in parallel with the formation of the rotor laminated iron core 2 in steps S11 to S15, for example.

Next, the rotor laminated iron core 2 and the end surface plates 3 are conveyed to the welding device 700, and the end surface plates 3 are disposed on the end surfaces S1 and S2 of the laminate 10, respectively. In this state, the laminate 10 and the end surface plates 3 are sandwiched by the pair of protective plates 701. Next, the controller Ca instructs the welding torch 702 to weld the end surface plates 3 and the laminate 10 (see step S17 in FIG. 5). Accordingly, the rotating body 5 is configured in which the end surface plates 3 are joined to the rotor laminated iron core 2 (laminate 10) via the weld bead B.

Next, the shaft 4 is attached to the rotating body 5 (see step S18 in FIG. 5). The shaft 4 may be, for example, shrink-fitted to the rotating body 5. Thus, the rotor 1 is completed.

[Effect]

According to the above, the laminate 10 and the end surface plates 3 can be welded in the state where the oil is removed therefrom. Thus, for example, generation of soot, discoloration of the laminate, generation of blow holes, and the like are significantly prevented. Therefore, the welding quality can be improved when welding the laminate 10 and the end surface plates 3.

According to the above, the oil adhering to the end surface plates 3 is removed, and the end surface plates 3 are delaminated from the temporary laminate 11 one by one. Thus, since the oil is removed from the end surface plates 3 one by one, it is difficult for the oil to remain on the end surface plates 3. Therefore, the welding quality can be further improved when welding the laminate 10 and the end surface plates 3.

According to the above, gas is blown onto the end surface plates 3 to blow off the oil from the end surface plates 3. Thus, since the oil is easily volatilized by the gas flow, the oil can be effectively removed from the end surface plates 3 with a very simple method.

According to the above, the oil is evaporated from the laminate 10 by subjecting the laminate 10 to a heat treatment. Thus, the removal of oil from the laminate 10 and the preheating of the laminate 10 are performed at once. Therefore, since it is not necessary to heat the laminate 10 from room temperature to a predetermined temperature in the subsequent resin injecting device 600, the operation of injecting the molten resin into the magnet-insert hole 16 by the resin injecting device 600 can be reduced. As a result, the production efficiency of the laminated iron core can be increased and the oil can be effectively removed from the laminate 10.

Other Embodiments

Although the embodiment according to the present disclosure is described in detail, various modifications may be made to the above embodiment without departing from the scope of the claims.

(1) Instead of removing the oil from the end surface plates 3 one by one, the oil adhering to the temporary laminate 11 may be entirely removed. For example, similarly to the oil removal from the laminate 10, the temporary laminate 11 may be conveyed into the preheating device 500, and most or all of the oil adhering to the temporary laminate 11 may be evaporated. In this case, the oil can be efficiently removed from the plurality of end surface plates 3.

Figure 6:
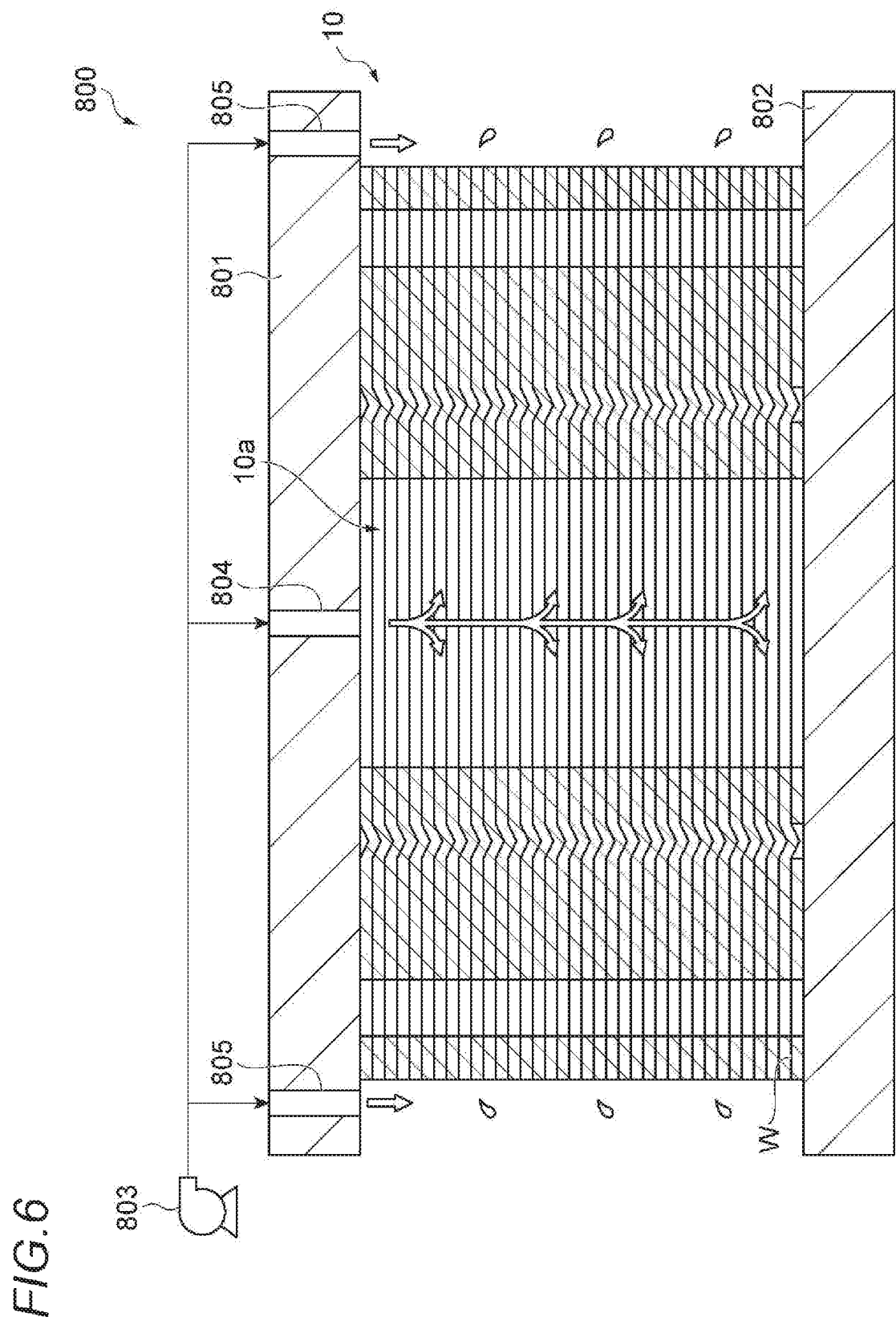
FIG. 6 is a schematic cross-sectional view showing an example of an oil removing device.

(2) Instead of removing the oil from the laminate 10 by using the preheating device 500 serving as an oil removing unit by heat treatment, the oil may be removed from the laminate 10 using an oil removing device 800 shown in FIG. 6. The oil removing device 800 includes a pair of sandwiching members 801, 802, and a blower 803. The sandwiching member 802 located on the upper side is provided with one through hole 804 and a plurality of through holes 805. The through hole 804 is provided at a central portion of the sandwiching member 802. In a state where the sandwiching members 801, 802 sandwich the laminate 10, the through hole 804 communicates with the shaft hole 10a of the laminate 10. The plurality of through holes 805 are provided in the vicinity of a peripheral edge of the sandwiching member 802. In a state where the sandwiching members

801, 802 sandwich the laminate 10, the plurality of through holes 805 are located in the vicinity of the outer circumferential surface of the laminate 10.

The blower 803 operates based on an instruction from the controller Ctr, and is configured to send gas (for example, air) to the penetration holes 804, 805. The temperature of the gas may be about 5° C. to 150° C., for example. The blower 803 may be, for example, an air blower configured to blow normal temperature air, or may be a dryer configured to blow hot air or warm air.

When the controller Ctr instructs the blower 803 to supply gas to the laminate 10, the gas from the blower 803 is blown to the shaft hole 10*a* of the laminate 10 through the through hole 804, and the gas from the blower 803 is blown to the outer circumferential surface of the laminate 10 through the through holes 805. The gas blown to the shaft hole 10*a* through the through hole 804 flows between the plurality of punched members W from an circumferential surface of the laminate 10 and reaches the outer circumferential surface of the laminate 10. The oil interposed between the plurality of punched members W is pushed out to the outer circumferential surface of the laminate 10 by the gas flow.

The gas blown to the outer circumferential surface of the laminate 10 through the through hole 805 blows off the oil pushed out to the outer circumferential surface. Accordingly, most or all of the oil is removed from the laminate 10. The gas may be circulated between the plurality of punched members W from the inner circumferential surface side to the inner circumferential surface of the laminate 10. The oil adhering to the temporary laminate 11 may be entirely removed using the oil removing device 800.

(3) Various methods may be used to remove the oil from the laminate 10. For example, gas (including volatilized oil) may be sucked from the periphery of the laminate 10 using a suction pump or the like. The laminate 10 may be disposed in a vacuum container, and the periphery of the laminate 10 may be in a vacuum state. The laminate 10 may be heated at a temperature lower than 400° C. to promote the volatilization of the oil adhering to the laminate 10. An operator may wipe off the oil from the laminate 10 using cloth, paper, or the like. An oil decomposing agent that can decompose machine oil or the like may be supplied to the laminate 10. The above-described various methods for removing oil may be adopted in a case of removing the oil from the end surface plates 3 one by one, or in a case of entirely removing the oil adhering to the temporary laminate 11.

(4) The laminate 10 and the end surface plates 3 may be welded without using the protective plate 701.

(5) In a case where the laminate 10 and the end surface plate 3 have different thermal expansion coefficients, a deformation difference between laminate 10 and end surface plate 3 during welding may be made closer to a deformation difference between the same during the operation of the rotor 1 by heating or cooling the laminate 10 and/or the end surface plate 3 during the welding of the laminate 10 and the end surface plate 3.

(6) One or more methods, procedures, steps or operations described in this description may be applied not only to the manufacture of the rotor laminated iron core 2 but also to the manufacture of a stator laminated iron core.

EXAMPLES

Example 1: a method for manufacturing a laminated iron core product (5) according to an example of the present disclosure includes: laminating a plurality of iron core members (W) which are punched from a first metal plate (M2) to form a laminate (10); removing oil adhering to the laminate (10); removing oil adhering to an end surface plate (3) which is punched from a second metal plate (M1); and disposing the end surface plate (3) on an end surface of the laminate (10) and welding the end surface plate (3) and the laminate (10). In this case, the laminate and the end surface plate can be welded in the state where the oil is removed therefrom. Thus, for example, generation of soot, discoloration of the laminate, generation of blow holes, and the like are significantly prevented. Therefore, the welding quality can be improved when welding the laminate and the end surface plate.

Example 2: the method according to Example 1 further includes laminating a plurality of end surface plates (3) which are punched from the second metal plate (M1) to form a temporary laminate (11), in which removing the oil adhering to the end surface plate (3) may include delaminating one end surface plate (3) of the plurality of end surface plates (3) from the temporary laminate (11) and removing oil adhering to the one end surface plate (3). In this case, since the oil is removed from the end surface plates one by one, it is difficult for the oil to remain on the end surface plates. Thus, the welding quality can be further improved when welding the laminate and the end surface plate.

Example 3: the method according to Example 1 further includes laminating a plurality of end surface plates (3) which are punched from the second metal plate (M1) to form a temporary laminate (11), in which removing the oil adhering to the end surface plate (3) may include removing oil adhering to the plurality of end surface plate (3) configuring the temporary laminate (11). In this case, since the oil is entirely removed from the temporary laminate at once, the oil can be efficiently removed from the plurality of end surface plates.

Example 4: in the method according to any one of Example 1 to Example 3, removing the oil adhering to the end surface plate (3) may include blowing gas onto the end surface plate (3) to blow off the oil from the end surface plate (3). In this case, since the oil is easily volatilized by the gas flow, the oil can be effectively removed from the end surface plates with a very simple method.

Example 5: in the method according to any one of Example 1 to Example 4, removing the oil adhering to the laminate (10) may include evaporating the oil from the laminate (10) by subjecting the laminate (10) to a heat treatment. Thus, the removal of oil from the laminate and the preheating of the laminate are performed at once. Thus, the production efficiency of the laminated iron core can be increased and the oil can be effectively removed from the laminate.

A part of reference numerals and signs used in the embodiment is listed below.

1: rotor
 2: rotor laminated iron core
 3: end surface plate
 5: rotating body (laminated iron core product)
 10: laminate
 11: temporary laminate
 12: permanent magnet
 14: solidified resin
 16: magnet-insert hole
 100: manufacturing apparatus
 200, 300: punching unit
 400: oil removing device
 500: preheating device
 600: resin injecting device
 700: welding device B: weld bead
Ctr: controller (control unit)
M1: metal plate (second metal plate)
M2: metal plate (first metal plate)
W: punched member (iron core member)

What is claimed is:

1. A method for manufacturing a laminated iron core product, the method comprising:
    laminating a plurality of iron core members which are punched from a first metal plate to form a laminate;
    removing oil adhering to the laminate;
    laminating a plurality of end surface plates which are punched from a second metal plate to form a temporary laminate;
    removing oil adhering to an end surface plate which is punched from the second metal plate; and
    disposing the end surface plate on an end surface of the laminate and welding the end surface plate and the laminate, wherein
    removing the oil adhering to the end surface plate includes delaminating one end surface plate of the plurality of end surface plates from the temporary laminate and removing oil adhering to the one end surface plate.

2. The method for manufacturing the laminated iron core product according to claim 1, wherein removing the oil adhering to the end surface plate includes blowing gas onto the end surface plate to blow off the oil from the end surface plate.

3. The method for manufacturing the laminated iron core product according to claim 1, wherein removing the oil adhering to the laminate includes evaporating the oil from the laminate by subjecting the laminate to a heat treatment.

4. The method for manufacturing the laminated iron core product according to claim 1, wherein removing the oil adhering to the laminate includes blowing gas onto the laminate to blow off the oil from the laminate.

* * * * *